Aug. 23, 1938.  H. M. AUSTIN  2,127,853
EXPANSION JOINT
Filed Nov. 6, 1936
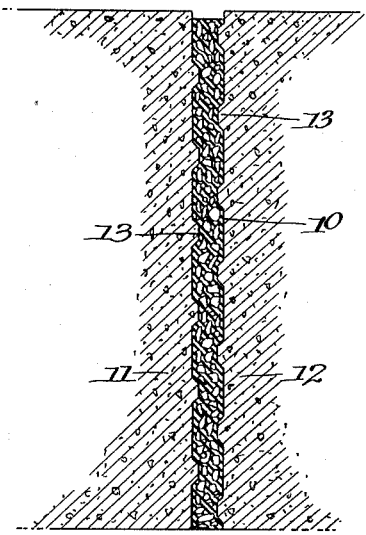
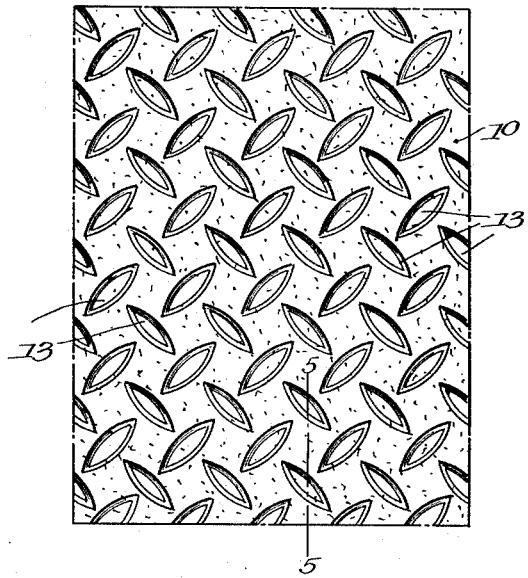
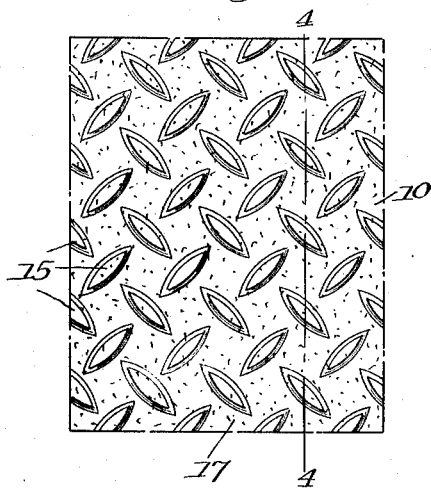
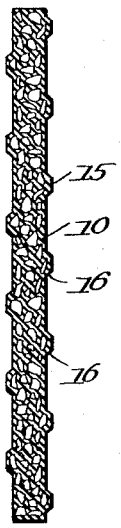
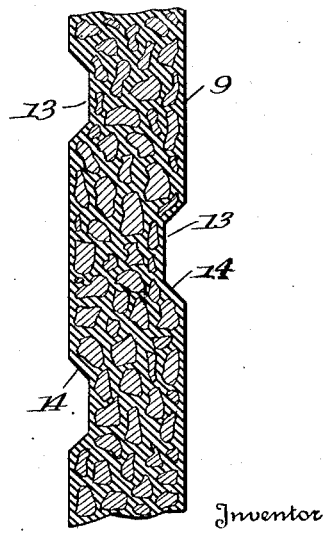
Inventor
Harry M. Austin
By
Attorneys Patented Aug. 23, 1938

2,127,853

UNITED STATES PATENT OFFICE 2,127,853

EXPANSION JOINT

Harry M. Austin, Baltimore, Md., assignor to Crown Cork & Seal Company, Inc., Baltimore, Md., a corporation of New York Application November 6, 1936, Serial No. 109,587
6 Claims. (Cl. 94—18)

This invention relates to expansion joint material formed from a mixture of comminuted cork and vulcanized rubber.

It is an important feature of the invention that the cork composition is resistant to moisture and abrasion, and possesses a high coefficient of compressibility and rebound.

Another important feature of the invention is its resistance to extrusion, due, for example, to the expansion and contraction characteristics of the materials forming the joint, such as concrete, structural steel and other materials. In order to eliminate this serious objection to present expansion joints, I have provided in the sides of the expansion joint of this invention either a multiplicity of indentations or projections, or both, which will permit, for example, the concrete to flow and fill such irregularities in the surfaces of the expansion joint and thereby lock the same in position substantially throughout its entire area.

A feature of very substantial importance, resides in the arrangement and configuration of the indentations or projections whereby they resist strains of the concrete or the metal as the case may be, in all directions, so that not only is the locking of the joint to the joint surfaces firmly accomplished, but the expansion joint itself will suffer no distortion or substantial reduction in its compressibility and rebound properties.

In the drawing I have disclosed several forms of the invention, but it will be understood that the invention may be modified in many ways and the present drawing is simply given by way of illustration although embodying the preferred form.

Referring to the drawing:

Figure 1 is an end section of a roadway having the expansion joint positioned therein.

Figure 2 is an elevation of the expansion joint material.

Figure 3 is an elevation of a modified form of expansion joint material.

Figure 4 is a section on the line 4—4 of Figure 3, and

Figure 5 is a section on the line 5—5 of Figure 2.

In manufacturing the cork composition forming the expansion joint of this invention, and simply by way of illustration, I prepare a rubber batch consisting of seventy pounds of smoked sheet, twenty pounds Ureka C and five pounds Quantal. This batch is formed by treating in a rubber mill until the rubber is suitably broken down whereupon the accelerators are added and thoroughly mixed with the rubber mass. The mass is allowed to stabilize, i. e., exposed to air for a substantial period, such as twenty-four hours or more. This rubber batch imparts to the cork composition its resilient characteristics as well as acts as a binder.

I then add to a suitable Banbury mixer reclaimed rubber in the amount of one hundred and twenty pounds and mix therewith zinc oxide in the amount of substantially seven pounds. The rubber batch above referred to is also added to the Banbury and after the mixture has assumed the desired consistency, cork is added. Preferably, I add first cork fines, i. e. granules of the size which will just pass a one-eighth inch mesh screen in the amount of about ninety-two pounds, and then I add oversize granules of a size which will be retained on a three-sixteenth inch mesh screen in the amount of about forty pounds. Mixing is continued until the batch assumes the desired consistency, whereupon sulphur or other vulcanizing agent is supplied as well as a pigment if desired. The reclaimed rubber is the principal binding medium, but also imparts resiliency to the cork composition.

The mixture is removed from the Banbury in the form of lumps and strips and is now remixed in a rubber mill from which it is discharged in the form of sheets or strips. These sheets or strips are now calendared to the desired thickness, width and length. If a one-half inch final thickness is desired, the sheets or strips are compressed to about six-seventeenths of an inch and then cut to the desired size. The calendared and severed sheet or strip is now placed in a mold and vulcanized at a temperature of substantially 300° F. The vulcanizing in the mold acts to slightly swell the product so that when taken therefrom at the conclusion of the vulcanizing period it will have the one-half inch thickness desired. The vulcanization, moreover, results in the formation upon the surface of the expansion joint material of a moisture and abrasion resistant rubber-like skin 9 which is best seen in Figure 5.

The mold may be of any desired configuration, but is preferably provided with indentations or projections so as to produce an irregular surface as shown in the drawing.

Referring to Figure 1, I have illustrated the cork composition as a whole at 10 disposed between concrete paving sections 11 and 12 of a usual roadway. It will be noted that the side faces of the joint are provided with indentations 13 in which the concrete has flowed and forms a permanent lock. This locking prevents extrusion of the joint strip when the concrete sections expand or contract under temperature and humidity changes. It is an important characteristic of the cork composition of the invention that notwithstanding that it is compressed when expansion takes place, it possesses a very long life and a high rebound coefficient so as to at all times form the desired seal.

The proportions of the mix above referred to may be varied as desired and likewise the thickness of the strip will be changed to accord with the particular conditions of application.

The cork granules employed are of a size in each case to retain their cork properties, i. e. their compressibility and rebound characteristics. The rubber is present in amount to constitute a binder as well as to impart the desired resilient properties to the mass and also to assure formation of the surface skin or envelope.

A very important characteristic of the product upon removal from the vulcanizing mold is the presence on the surface thereof of the relatively thin rubber skin or envelope 9. This is due to the fact that in the manufacture of the product, the rubber is caused to bloom at the surface and this thin rubber skin or envelope is particularly advantageous in imparting moisture resistance as well as abrasion resistance to the expansion joint.

The waterproof character of the expansion joint may be enhanced by passing the joint material after vulcanization and while still warm through a bath of bitumen or other suitable moisture resistant material such as asphalt.

Referring to Figure 5, I have illustrated the indentations 13 in detail and it will be noted that they are substantially dish-shaped having inclined or curved walls 14. The advantage of this is that the concrete may readily flow into the indentations and when expansion or contraction takes place or any movement of the joint surfaces, the joint material is not ripped or distorted, but instead the joint material will be compressed as the concrete moves against it and return easily to normal position. In other words no shearing of the expansion joint surface takes place, but the shearing action is absorbed by the body of the material. In Figure 4 I have shown instead of indentations, projections 15 formed in the side surfaces of the expansion joint, and, like the indentations, the walls 16 of these protuberances are tapered and rounded so as to avoid any distortion of the joint material upon movement of the joint surfaces due to temperature or humidity changes.

As shown in Figures 2 and 2, the indentations or projections are respectively substantially oval in contour and they are arranged in rows with alternate indentations or projections of each row at right angles to each other, the rows being diagonally disposed. Preferably the rows are arranged to extend at a 45° angle to one edge 17 of the expansion joint so that when the joint is positioned in the roadway as shown in Figure 1, they have this angularity with respect to the horizontal plane. The importance of this construction resides in a consideration of the fact that, for example, in the case of concrete, the expansion and contraction takes place in all directions.

For the first time in expansion joint material by reason of the arrangement of the projections or indentations, the strains to which the expansion joint is subjected are absorbed in all directions, and hence the expansion joint being locked to the concrete slabs as shown in Figure 1, is effectively prevented from being extruded. As will be appreciated, extrusion has constituted one of the most serious problems in connection with expansion joints, but in accordance with the present invention, I not only have overcome the extrusion difficulties by absorbing the shearing strains set up in all directions by the joint surfaces, but have provided the expansion joint surfaces with a configuration which will be permanent and resistant to any distortion upon movement of the joint surfaces.

The projections and indentations may, of course, take any forms, for example they may be made circular and dish-like, and it is the province of this invention that their arrangement and their configuration shall be such as to impart to the expansion joint material the two important characteristics just recited.

In laying a roadway, for example, a standard metal form is first positioned, then a strip of expansion joint material according to this invention is disposed adjacent the form on the pouring side thereof and the concrete poured. The form is then removed and the concrete is poured between the said expansion joint strip and the next metal form similarly provided on the pouring side with an expansion joint. The ability to form the roadway in this manner is due to the properties of the present expansion joint material, namely its moisture and abrasion resistance, high compressibility and rebound, and its locking surfaces.

I claim:

1. Expansion joint material having its surface formed with a plurality of portions offset from the main plane of the surface and connected thereto by walls inclined throughout their area, said portions being arranged in rows with adjacent portions at angles to the others.

2. Expansion joint material having its surface formed with a plurality of indentations, the walls of said indentations throughout the area thereof being inclined inwardly toward the bottoms of the indentations, said indentations being arranged in rows with adjacent indentations arranged at angles to the others.

3. Expansion joint material comprising a compressible mixture of comminuted cork and vulcanized rubber and having its surface formed with a plurality of indentations, the walls of said indentations throughout the area thereof being inclined inwardly toward the bottoms of the indentations, said indentations being arranged in rows with adjacent indentations arranged at angles to the others.

4. Expansion joint material having its surface formed with a plurality of protuberances, the walls of said protuberances extending throughout the area thereof outwardly and downwardly toward the surface of the material, said protuberances arranged in rows with adjacent protuberances disposed at angles to the others.

5. Expansion joint material comprised of a compressible mixture of comminuted cork and rubber, and having its surface formed with a plurality of protuberances, the walls of said protuberances extending throughout the area thereof outwardly and downwardly toward the surface of the material, said protuberances arranged in rows with adjacent protuberances disposed at angles to the others.

6. Expansion joint material having its surface formed with substantially oval offset portions, the walls of which are inclined throughout their area, said offset portions being arranged in rows with adjacent offset portions having their major axes disposed along intersecting lines.

HARRY M. AUSTIN.